United States Patent [19]

Hanamura et al.

[11] 4,400,236
[45] Aug. 23, 1983

[54] ROTATING DISC EVAPO-EXTRUSION PROCESS AND APPARATUS

[75] Inventors: Yoshimi Hanamura; Masahiro Yuyama; Akira Sakuramoto, all of Niihama, Japan

[73] Assignee: Sumitomo Chemical Company, Limited, Osaka, Japan

[21] Appl. No.: 295,304

[22] Filed: Aug. 24, 1981

[30] Foreign Application Priority Data

Aug. 27, 1980 [JP] Japan .............................. 55-118905
Aug. 27, 1980 [JP] Japan .............................. 55-118906
Mar. 5, 1981 [JP] Japan .............................. 56-32158

[51] Int. Cl.$^3$ .................. B01D 1/22; B01D 1/30; B01J 19/18
[52] U.S. Cl. .................. 159/2 E; 159/47.1; 159/DIG. 10
[58] Field of Search .............. 528/501; 159/2 R, 2 E, 159/47.1, 49, DIG. 10

[56] References Cited

U.S. PATENT DOCUMENTS 3,009,685 11/1961 Rettig ........................... 159/2 E
3,046,603 7/1962 Maxwell .
3,280,886 10/1966 Marshall et al. .............. 159/2 E
3,545,041 12/1970 Maxwell ....................... 159/2 E

FOREIGN PATENT DOCUMENTS 1467045 3/1977 United Kingdom .

OTHER PUBLICATIONS

Weissenberg, K., "A Continuum Theory of Rheological Phenomena," Nature, vol. 159 (1947).
Bryce Maxwell et al., Modern Plastics, 37, 107-114 & 202-210, (1959).

Primary Examiner—Bradley Garris
Attorney, Agent, or Firm—Birch, Stewart, Kolasch & Birch

[57] ABSTRACT

An improved process for the removal of volatile components from polymer compositions containing volatile components such as unreacted monomers, solvents, by-products or impurities by a rotating disc evapo-extrusion, and an apparatus therefor. The present invention is particularly useful for the removal of the volatile components from polymer compositions having a high content of volatile components such as 25 to 99.9% by weight, particularly methyl methacrylate polymer compositions useful for the production of molding materials or extrusion plates which contain 60% by weight or more of methyl methacrylate monomer.

27 Claims, 9 Drawing Figures

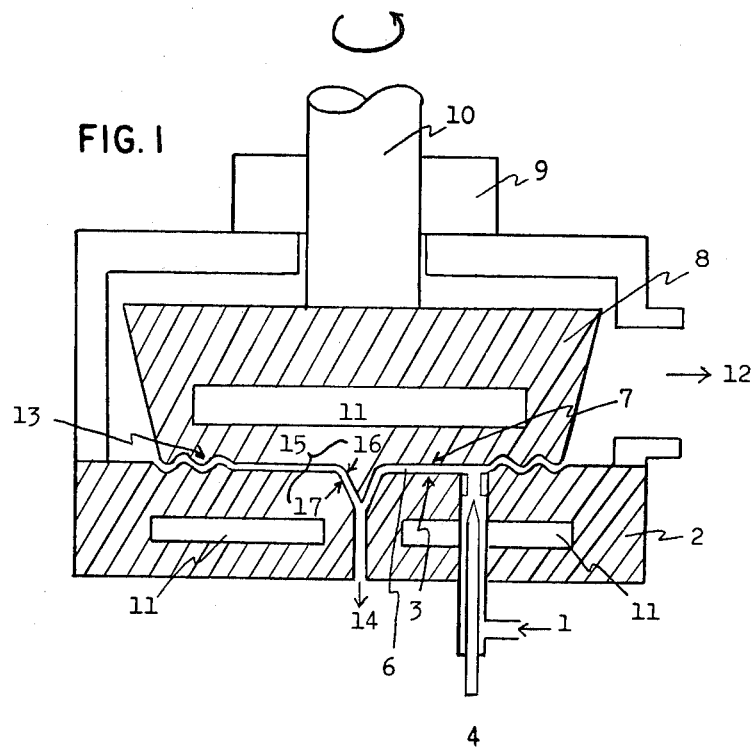
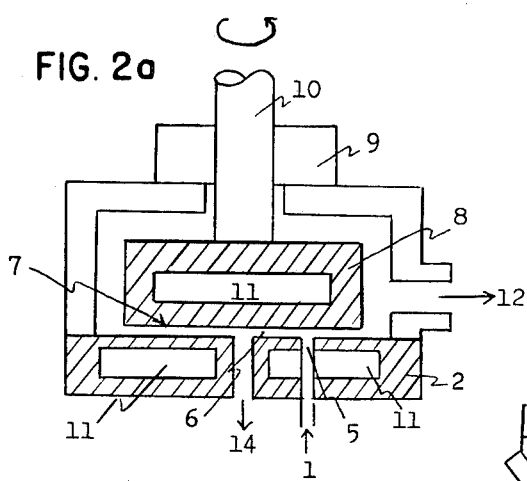
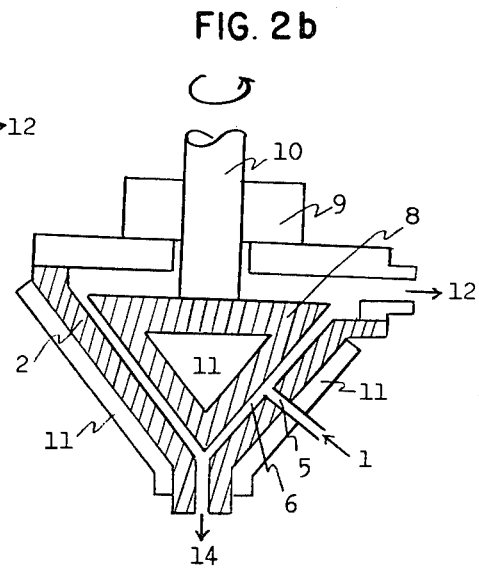

ROTATING DISC EVAPO-EXTRUSION PROCESS AND APPARATUS

The present invention relates to a rotating disc evapo-extrusion process and an apparatus therefor. More particularly, it relates to a process for continuously removing volatile components from thermoplastic polymer compositions containing volatile components such as unreacted monomers, solvents, by-products or impurities by a roating disc evapo-extrusion and an apparatus therefor.

It is known that from polymer compositions containing volatile components in large amounts of 25% by weight or more, the volatile components are continuously removed and recovered together with extruding the polymer compositions, and that such a technique is very useful and important in producing resinous or rubbery thermoplastic polymer compositions by a bulk polymerization method or a solution polymerization method or in recovering the volatile components from the polymer compositions.

In the production of thermoplastic polymer compositions by a bulk polymerization or solution polymerization method, the polymerization system unfavorably shows remarkably high viscosity and/or too high of an exotherm owing to the polymerization reaction with an increase of the polymer content in the liquid polymer compositions. Accordingly, it is very difficult to increase the polymer content to more than 70% by weight by using the conventional continuous polymerization apparatus, particularly a reactor with an agitation vessel, while it may depend on the polymerization degree and polymerization temperature. In order to increase the polymer content to more than 70% by weight, it is required to use an expensive specific apparatus having a specific aggitation capacity and a large heat transfer area, and even if such an expensive specific apparatus is used, it is difficult from practical viewpoint to produce a polymer composition having a polymer content of 75% by weight or more because the required agitation effort and shear exotherm due to agitation becomes extremely high. In other words, it is very difficult to decrease the content of volatile components of polymer compositions such as unreacted monomers, solvents, or by-products to less than 25% by weight.

On the other hand, it is not industrially practiced to produce polymer compositions having a polymer content of less than 10% by weight by bulk polymerization or solution polymerization methods because it requires severe conditions for evaporating unreacted monomers, solvents, by-products etc. Additionally, such a process also requires a larger scale apparatus for increasing an amount of materials to be circulated, which results in an unfavorable increase in energy consumption, even though it is very easy to control the reaction system because the polymerization system has a lower viscosity. It is also industrially valuable to remove volatile components from polymer compositions having such a low polymer content as 0.1 to 10% by weight such as in recovering solvents or the like from the polymerization system or in the production of diene polymers or copolymers which easily form crosslinked structures and are easily gelled when they are polymerized or copolymerized to a higher polymer content.

It is known to remove volatile components from polymer compositions by heating the polymer compositions to a high temperature and then evaporating the volatile components under vacuum condition. Where the content of volatile components is less than 10% by weight, they are easily removed by a so-called vented extruder.

In case of removing volatile components from polymer compositions having a high volatile component content of 25 to 99.9% by weight, there are various problems to be solved. One of the problems is that it is difficult to get the heat for sufficiently heating the polymer compositions to evaporate the volatile components. The second problem is that when they are evaporated under vacuum or under atmospheric pressure, it becomes difficult to transfer or heat the polymer compositions because of an increased apparent volume due to foaming or increased viscosity. Furthermore, the surface of the compositions is cooled and solidified, by which the evaporation of volatile components is inhibited. The third problem is that owing to the side reactions such as decomposition by the reaction at a high temperature under a high pressure or vacuum condition, the products are unfavorably contaminated with various by-products or colored, and hence the polymer compositions or recovered volatile components have inferior quality. Further, that since such side reactions directly depend on the retention time, it is necessary to shorten the treating time as much as possible in order to avoid the partial stagnation of reactants at a high temperature.

It is well known that there is an important defect when volatile components are removed from liquid polymer compositions containing volatile components by evaporation with the conventional agitation vessel, kneader or falling film evaporator. Hence there have been proposed various improved methods of flush evaporation, for example, a method of blowing down the compositions to be treated in the form of a strand into an evaporation vessel under vacuum (cf. Japanese Patent Publication Nos. 120/1963, 20097/1969 and 31678/1970), and a method of using a rotor which can aid the transfer of the polymer composition after removal of volatile components (cf. Japanese Patent Publication (unexamined) No. 27872/1972). These methods may somewhat alleviate the problems such as heat, transfer, solidification of surface, and stagnation as mentioned above, but the improvement is still not sufficient.

There is another improvement comprising directly blowing a pressured and heated polymer composition to a supply screw in a screw extruder which is maintained under vacuum or atmospheric pressure (cf. Japanese Patent Publication No. 17555/1977 and Japanese Patent Publication (unexamined) No. 88193/1975). This method almost solves the above-mentioned problems, but it is still not satisfactory because there is still a problem in the solidification of the surface of the composition in the evaporation space, and also, it is required to remove the volatile components at the bent part in order to decrease sufficiently the remaining volatile components.

It is also proposed to extrude a molten polymer composition with a rotating disc extruder (cf. Japanese Patent Publication Nos. 2992/1970 and 39698/1975, and Japanese Patent Publication (unexamined) Nos. 92463/1973 and 56161/1977), but it has never been reported to apply such a rotating disc extruder to removal of a large amount of volatile components.

An object of the present invention is to provide an improved process for removal of volatile components from polymer compositions containing a large amount of volatile components without the above-mentioned problems, more particularly a process of removal of volatile components by heating a polymer composition containing a large amount of volatile components at a fixed temperature under a fixed pressure and blowing directly the pressurized and heated composition onto a rotating area through a pore (a flush nozzle) in a rotating disc type evapo-extrusion apparatus, by which the above-mentioned various problems such as heat, transfer, solidification of surface and stagnation are completely solved, and the process can be continuously operated. Another object of the invention is to provide an apparatus useful for the above process. These and other objects and advantages of the present invention will be apparent to persons skilled in the art from the following description.

The rotating disc evapo-extrusion process for removing volatile components from a thermoplastic polymer composition containing volatile components such as unreacted monomers, solvents and/or by-products of the present invention comprises:

- applying a pressure sufficient to maintain the composition in a substantially liquid state and all or a part of the heat necessary for evaporating the volatile components to the composition,
- supplying the pressured and heated composition to a rotating disc evapo-extrusion machine, wherein a rotor and a stator are provided so as to face each other substantially parallel and separated by a fixed space and the inner pressure is kept under a pressure of from 5 Torr to 1,500 Torr, said pressured and heated composition being supplied through a pore which is provided so as to penetrate the stator and being directly blown onto the face of rotor,
- thereby separating and recovering a majority of the volatile components from the peripheral part of the rotor, and
- transferring with heating the polymer composition toward the central area of the face of rotory by a hydrodynamic pressure produced by the rotation of the disc, during which the remaining volatile components are completely separated completely and taken out from an outlet which is provided at the central area of the face of stator.

The rotating disc evapo-extrusion apparatus of the present invention comprises:

- a rotor and a stator which are arranged so as to face each other in substantially parallel,
- a means for keeping the distance between both faces of the rotor and the stator at a fixed space,
- a means for sealing the axis so as to keep the inner pressure of the apparatus at a fixed pressure,
- a pore for supplying a polymer composition which is provided so as to penetrate the stator and the face thereof,
- a means for controlling the size of the pore in order to maintain the pressure of the polymer composition to be supplied,
- a means for driving the rotor in order to produce a hydrodynamic pressure by the rotation of the rotor,
- an outlet for taking out the volatile components from the peripheral part of the face of rotor,
- an outlet for taking out the polymer composition free from volatile components, and
- a means for maintaining the outlet for taking out the polymer composition at a fixed degree of opening.

The present invention will be illustrated in more detail with reference to the accompanying drawings.

FIG. 1 is a front sectional view of an embodiment of the rotating disc evapo-extrusion apparatus of the present invention, FIGS. 2-a and 2-b are a front sectional view of another embodiments of the rotating disc evapo-extrusion apparatus of the present invention.

FIGS. 3-a, 3-b and 3-c are a front sectional view and a front view of embodiments of the rotor and stator having verious shapes used in the present apparatus.

Figure 3C:
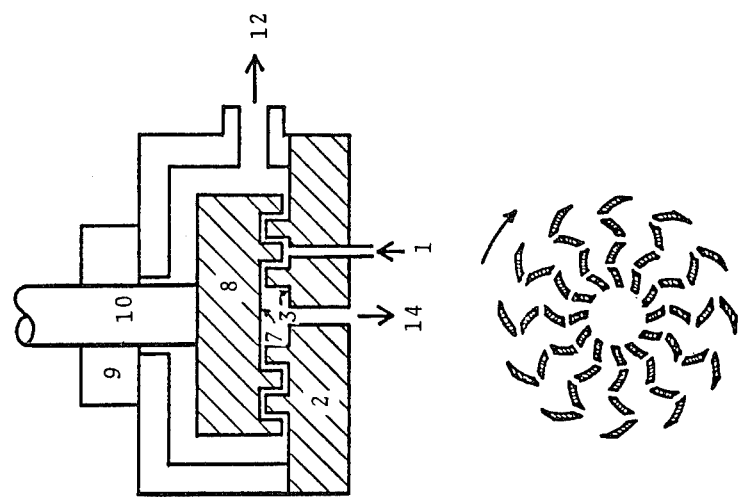

Referring to FIG. 1, a thermoplastic polymer composition containing preferably 25 to 99.9% by weight of volatile components such as unreacted monomers, solvents and/or by-products, which is pressured and heated to a fixed pressure and a fixed temperature, is introduced through an inlet (1) to a gap (6) and a rotor face (7) via a pore (nozzle) (5) which is provided so as to penetrate a stator (2) and a face thereof (3) and is accompanied with a needle valve (4) for controlling the pressure. A rotor (8) with a face thereof (7) is rotated with a rotating axis (10) which is supported by an axis-sealing part (9). The face (3) of the stator and the face (7) of the rotor are separated by a fixed space, and the gap (6) formed between faces (3) and (7) is kept under a pressure of from 5 Torr to 1,500 Torr. Within the stator (2) and/or the rotor (8), a heating medium circulation (11) is provided in order to heat the polymer composition in the gap (6). The volatile components are separated at the gap (6) and taken out and recovered from an outlet (12) which is provided at the peripheral part of the rotor. The embodiment shown in FIG. 1 has winding part (13) which is effective in preventing the entrapment of a part of the polymer composition with volatile components toward the peripheral part of the rotor, but the winding part is not essential. After removing a majority of the volatile components, the polymer composition is transferred toward the central part of the rotor face (7) by the hydrodynamic pressure produced by the rotation of the rotor. During this transfer, the removal of volatile components is continuously effected by heating with heat transferred from the stator face (3) and the rotor face (7), with a shearing exotherm, and by refreshing the surface of the composition by shearing. After completion of the removal of the volatile components, the polymer composition is further made dense by the hydrodynamic pressure and then taken out from an outlet (14) which is provided at around the central area of the stator face (3). A small screw (16) is provided on the rotor (8) in the same axial direction as the rotating axis (10) at around the outlet (14). This screw (16) acts as an auxiliary pump (15) for keeping the extrusion speed at a fixed speed.

In the rotating disc evapo-extrusion apparatus of the present invention, the rotating axis may be arranged at any vertical, horizontal or intermediate direction in view of the functional principle, but it is usually arranged in the vertical direction as shown in FIG. 1.

When resinous or rubbery thermoplastic polymer compositions useful for the preparation of molding materials or extrusion plates are continuously produced by a bulk polymerization or solution polymerization method, the polymerization reaction is usually carried out at a temperature of 130° to 170° C. at a viscosity of the solution of ten several to several thousand poises in view of the restriction of heat balance, prevention of by-products and polymerization stability. According to the known processes, for example, the processes disclosed in Japanese Patent Publication No. 17555/1977 and Japanese Patent Publication (unexamined) No. 88193/1975, it is essential to initially provide the entire amount of heat necessary for evaporating the volatile components to the polymer composition before evaporation of the volatile components. For example, in case of a methyl methacrylate resin composition, it is essential to heat the composition to 210° C. or higher. Contrarywise, according to the present invention all of the heat provided by heat transfer from outside through the stator face (3) and the rotor face (7), such as high-frequency heating, heat supplied by dielectric heating, and the heat produced by shearing between the faces (3) and (7), is effective in raising the temperature of the polymer composition, and hence, an additional specific heating device is not required. Accordingly, the polymer composition containing a large amount of volatile components can advantageously be treated by the present invention. However, the present invention may also use a heating device. A preferred heating device is a scraping type heat exchanger, for example an extruder wherein a screw having a small flight gap is rotated at a high speed, said device having a high overall heat transfer coefficient, self-cleaning capacity and a short retention time. Such a device is preferable taking into consideration the high viscosity and change of properties with heating of the polymer composition.

According to the present invention, polymer compositions supplied from a previous polymerization step optionally via a heat exchanger, which are given only a part of the amount of heat required for evaporating the volatile components, can be treated without additionally heating the compositions to such a high temperature which could cause deterioration the properties of the composition even in case of a polymer composition having volatile components in such a large amount as 60 to 99.9% by weight. The thermoplastic polymer compositions to be treated by the present invention may be the products produced by the continuous process as mentioned above or the products produced by a batch system, or may be polymer compositions or wastes containing thermoplastic polymer obtained from other processes, such as condensation polymerization, addition polymerization, ring opening polymerization etc. for the production of polymers for paints, films or fibers. When the polymer composition contains 99.9% by weight or more of volatile components, the composition is hardly treated by the present invention because hydrodynamic pressure is hardly effective.

The polymer compositions obtained from the previous polymerization step optionally via a heater usually have a temperature of about 50° C. higher than the evaporating point of the volatile components, preferably 150° to 290° C., and hence, the compositions are usually pressured under 5 to 100 kg/cm$^2$G, preferably 10 to 50 kg/cm$^2$G, in order to prevent foaming before introduction into the pore provided in the rotating disc evapo-extrusion apparatus. The previous polymerization step may be carried out under the same pressure as in the step of heat exchange, but a device for pressuring may be provided at the heat exchanger.

When the polymer composition to be supplied to the evapo-extrusion apparatus has a lower temperature than 50° C. higher than the evaporating point, usually lower than 150° C., it is difficult to decrease the volatile components remaining in the polymer composition, but on the other hand, when the temperature of the polymer composition to be supplied is higher than 290° C., the polymer composition is unfavorably deteriorated with heat. When the pressure to be added to the polymer composition is lower than 5 kg/cm$^2$G, it is difficult to keep the composition in a liquid state because of foaming due to boiling of the volatile components. But on the other hand, when the pressure is higher than 100 kg/cm$^2$G, it results unfavorably in a high cost of the apparatus and difficult operation without any additional advantage.

The pressurized and heated polymer composition is directly introduced to the rotor face (7) under a pressure of from 5 Torr to 1,500 Torr, preferably from 50 Torr to atmospheric pressure via the pore (5) from the outer side of the stator. When the pressure in the evapo-extrusion apparatus is higher than the above-mentioned pressure, the volatile components are insufficiently separated. On the other hand, when the pressure is lower than 5 Torr, it results unfavorably in various defects, such as lowering of the bulk density of the composition (and becoming bulky) after jetting via the pore (5), a lowering of the temperature, requiring too large a scale of device for condensing the volatile components, late appearance of hydrodynamic pressure and hence lowering of throughput capacity, and difficulty in the prevention of leaks at the axis-sealing part (9) on the rotor (8), even though amount of the remaining volatile components may be reduced.

The pore (5) functions for giving a pressure difference between the high pressure area and the low pressure area and for increasing the flow speed of the polymer composition in order to aid the separation of volatile components.

Occurrence of the pressure difference (pressure loss) first depends on the viscosity of the polymer composition as far as the polymer composition is kept in a liquid state. But the pressure becomes practically stationary because while the viscosity may occasionally be increased owing to an increase in the concentration of the composition because of foaming during passing through the pore (5) and owing to a lowering of the temperature, these to some extent act in self-equilibrium. However, when the pressure loss is too small or too large at the flow above the pore (5), the volatile components may occasionally blow out and hence the flow of the composition can become unstable. In such a situation, the composition shows increased viscosity due to foaming in the heat exchanger, resulting in stagnation of flow and a change or deterioration properties of the composition. Accordingly, the pressure loss at the pore (5) is controlled so as to obtain a pressure necessary for keeping the polymer composition in a liquid state. Besides, in order to prevent unfavorable blowing away of the volatile components and stagnation of the composition as mentioned above at the connection part of the pore (5) and the inner part of the apparatus, the pore (5) is provided at a location as close as just before possible to the space for evaporating the volatile components so as to penetrate the stator (3) from the face thereof, by which the polymer composition can directly be blown onto the face of rotor.

The apparatus may be provided with one or a plurality of pores (5), but usually is provided with from 1 to 3 pores (5) which are symmetrically spaced around the rotating center.

The separation of volatile components in the rotating disc evapo-extrusion apparatus in the present invention is carried out substantially in two stages. The first state occurs at around the outlet of the pore (5), where the volatile components are instantaneously and rapidly evaporated with foaming and by which the volatile components are removed in an amount corresponding to the amount of heat added previously in the previous polymerization step and/or in the heat exchanger. The second stage takes place during the transferring of the polymer composition toward the central area of the rotor (8) by the hydrodynamic pressure produced by the rotation of the rotor. In this stage the volatile components are almost completely removed by the heat transfer given from outside, the shearing exotherm of the polymer composition and also the refreshing of the surface of the composition with shearing. These two stages are practically carried out simultaneous with each other, and hence, the separation of volatile components seems to be carried out at one stage.

It has hitherto been tried to extrude the polymer composition in strand state from a multiple of pores or in a thin layer state in order to increase the evaporation area. It has also been proposed to previously add an amount of heat necessary for evaporating the volatile components to the polymer composition and directly blow the composition onto the screw of a extruder from the close distance without using any flush room for blowing out from the pore. This is done to reduce the difficulty in heating transferring of the bulky polymer composition blown out from the pore, whereby the volatile components are substantially completely removed, and whereby the polymer composition has a bulky and large evaporation area only for a very short period of time.

According to the present invention, instantaneous rapid evaporation and foaming occurs at around the outlet of the pore (5), but the composition is blown onto rotor face (7) before forming a large foam by the tremendous power, wherein continuous foams are formed by the aid of the shearing force between the face of the stator and the face of the rotor. Accordingly, the volatile components are smoothly recovered from the peripheral area of the rotor face (7) and the increase of volume due to foaming is minimized. In addition, the polymer composition to be separated is always kneaded with a large shearing force in the circumferential direction on the rotor face (7) while being transferred toward the central area of the rotor face (7) by the hydrodynamic pressure produced by the rotation of the rotor (8), by which the evaporation surface is refreshed and the time in which there is a bulky and large evaporation area can be shortened. Simultaneously, the polymer composition is uniformly heated within a very short period of time by the heat transfer with a high overall heat transfer coefficient of the stator face (3) and/or rotor face (7) or the above-mentioned exotherm due to the shearing force. Hence, the volatile components are continuously and more rapidly separated, by which the remaining volatile components can effectively be decreased. Moreover, after the volatile components are removed, the polymer composition is immediately made dense by the hydrodynamic pressure and is taken out from the outlet (14) which is provided at around the central area of the stator (2). Accordingly, the amount of time during which the polymer composition is retained at a high temperature can be greatly shortened and, hence, a polymer composition containing thermally unstable components can be treated without change or deterioration of the properties thereof.

The hydrodynamic pressure refers mainly to a centripetal force based upon a normal-stress effect or so-called Weissenberg effect. This phenomenon has been discovered by Dr. K. Weissenberg (cf. Nature, Vol. 159, page 310, 1947) and means that when a shearing force is added to a viscoelastic material in the circumferential direction, a stress appears, i.e. a normal stress in the direction right angle to the shearing force. In the present invention, when the stator face (3) and the rotor face (7) are rotated, there is produced the hydrodynamic pressure, by which the polymer composition is transferred toward the central area of the rotation and the volatile components such as unreacted monomers, solvents and by-products are taken out in the opposite side. As long as these functions are realized, the shape of the stator and the rotor is not restricted and may be in various shapes, such as a disc, conical, or cylindrical shape or a combination thereof, e.g. truncated cone.

FIGS. 2-a and 2-b show schematic front sectional views of embodiments of the present evapo-extrusion apparatus, wherein all symbols are the same as those in FIG. 1.

Figure 3B:
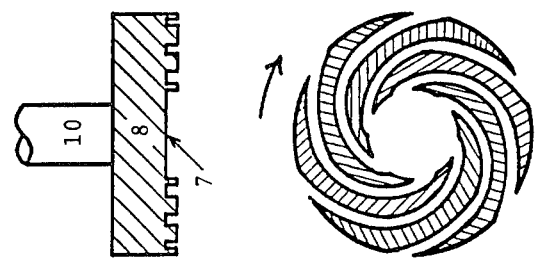
Figure 3A:
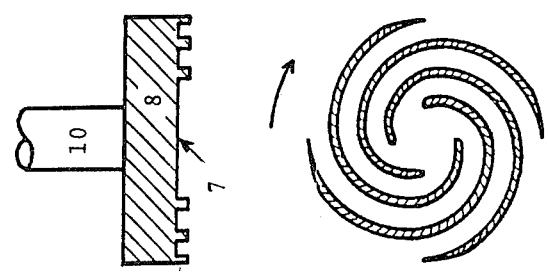

The rotor face (7) and the stator face (3) have usually a smooth surface, but may have a specific uneven surface, for example spiral, radial or logarithmic helical projections or channels, or concentric circularly arranged tilted blades. FIG. 3 shows some embodiments of the rotor and stator having various shapes used in the present evapo-extrusion apparatus. FIGS. 3-a and 3-b show a front sectional view and a front view of rotor (8) having spiral projections and logarithmic helical channels on the face (7) thereof, respectively. FIG. 3-c shows the front sectional view of the present evapo-extrusion apparatus wherein tilted blades are concentric circularly arranged on the rotor face (7) and the stator face (3) and a schematic view of the arrangement of the tilted blades, respectively.

The pore (5), which is provided at the side of the stator face (3), is usually provided at a position intermediate between the center of the rotor face (7) and the periphery of the appartus, preferably at a position 0.2 to 0.8 times the radius from the center. When the pore (5) is too close to the center of the face (7), the polymer composition is unfavorably taken out from the outlet (14) at the central area of the stator face (3) without sufficient removal of the volatile components. But on the other hand, when the pore (5) is too close to the periphery of the apparatus, the polymer composition unfavorably reaches the peripheral area without being effected by the hydrodynamic pressure and contaminants the outlet (12) for taking out the volatile components which is provided on the peripheral area of the rotor face (7).

The rotor (8) and/or the stator (2) have a cavity wherein a heating medium or steam is circulated in order to supply the necessary heat to the polymer composition by heat transfer from the rotor face (7) and/or the stator face (3). The heating medium is usually heated at 180° to 320° C., preferably 200° to 290° C. When the temperature of the heating medium is lower than the above lower limit, the volatile components are insufficiently separated, but on the other hand, when it is over the above upper limit, the polymer composition is unfavorably deteriorated. Moreover, when the polymer composition is blown onto the rotor face (7) via the pore (5), it should have a temperature 20° C. higher than the glass transition temperature of the polymer composition free from the volatile components. The temperature of the polymer composition to be supplied and the pressure within the apparatus are controlled so as to satisfy the above conditions, by which the desired hydrodynamic pressure is rapidly produced, and hence the capacity of the apparatus can particularly be increased and the size of the apparatus can be minimized.

After removing the volatile components by the present invention, the polymer composition usually has a remaining content of volatile components of from 0.3 to 10% by weight and an apparent specific gravity of from 0.5 to 1.3. It has surprisingly been found that under the preferred conditions of the present invention, one can obtain a polymer composition having a remaining content of volatile components of 0.3 to 1.0% by weight and an apparent specific gravity of 1.05 to 1.25 without any foaming by one stage removal of volatile components.

According to the present invention, desired resinous or rubbery thermoplastic polymer can easily and effectively be produced from liquid polymer compositions having a comparatively high polymer content produced by bulk polymerization or solution polymerization methods. The present invention can also be applied to the removal of volatile components from polymer compositions having a low polymer content, such as up to 10% by weight, for example dienic polymers or copolymers which form cross-linked structure and are easily gelled when they are polymerized to a high polymer content, and to which the conventional methods are hardly applicable. Moreover, according to the present invention, expensive starting monomers and solvents can easily be recovered in high purity and high yield from the wastes containing thermoplastic polymer. Thus, the process of the present invention can be applied to the materials having a wide range of polymer content of from 0.1 to 75% by weight.

The polymer composition treated by the present invention can be used as a molding material, coating resin, film resin or rubber after cooling, cutting and packaging in a usual manner. Besides, the monomers and solvents recovered by the present invention can be used again as they stand or after being purified in a usual manner.

The content of remaining volatile components in the obtained polymer composition becomes smaller when the temperature is higher, the degree of vacuum is higher and the shearing force is larger. On the other hand, the apparent specific gravity of the obtained polymer composition becomes smaller and the composition becomes more bulky when the temperature is lower and the shearing force is smaller. As a result of the present inventors' intensive study for reducing the content of remaining volatile components and increasing the apparent specific gravity, it has been found that it is effective to specify the temperature of the polymer composition and the degree of vacuum within the apparatus to the above-mentioned ranges, and to control the gap between the rotor face (7) and the stator face (3), and also the rotating speed of the rotor (8) to the optimum conditions. The optimum range of the gap between the faces (7) and (3) is 0.2 to 20 mm, more preferably 0.5 to 10 mm. When the gap is narrower than the above lower limit, it is difficult to increase the volume of the composition with foaming. On the other hand, when the gap is wider than the above upper limit, the obtained shearing force becomes unfavorably smaller. Additionally, the optimum range of the rotating speed of the rotor is 50 to 1,000 rpm, more preferably 100 to 500 rpm. When the rotating speed is smaller than the above lower limit, the necessary hydrodynamic pressure is not produced, and on the other hand, when it is larger than the above upper limit, the hydrodynamic pressure is unfavorably offset by the centrifugal force.

According to the present invention, the content of the remaining volatile components in the polymer composition can sufficiently be decreased by using only a single rotating disc evapo-extrusion apparatus, but if necessary, two or more apparatus may be used in series, or the apparatus it may be used together with other conventional apparatus.

Figure 4:
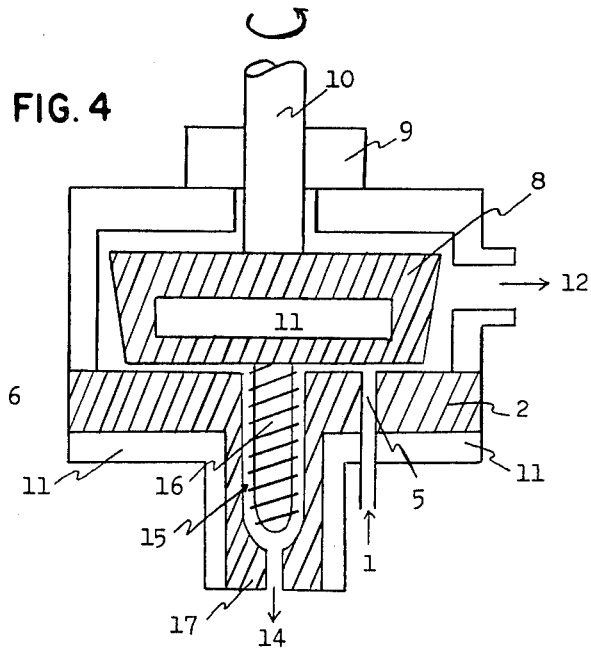
FIG. 4 is a front sectional view of an embodiment of the present apparatus suitable for giving an increased pressure to the polymer composition after removing volatile components.

FIG. 4 shows an embodiment of the present apparatus useful for increasing the pressure of the polymer composition after removing the volatile components and for extruding at a fixed amount. In the embodiment as shown in FIG. 4, an auxiliary pump (15) is constructed by a small screw (16) provided on the rotor (8) in the same axis as the rotating axis (10) and a barrel (17) provided on the central area of the stator (2). This apparatus is particularly useful in when using the present apparatus in series (e.g. in two stages) or when using it as an extrusion processing machine.

Figure 5:
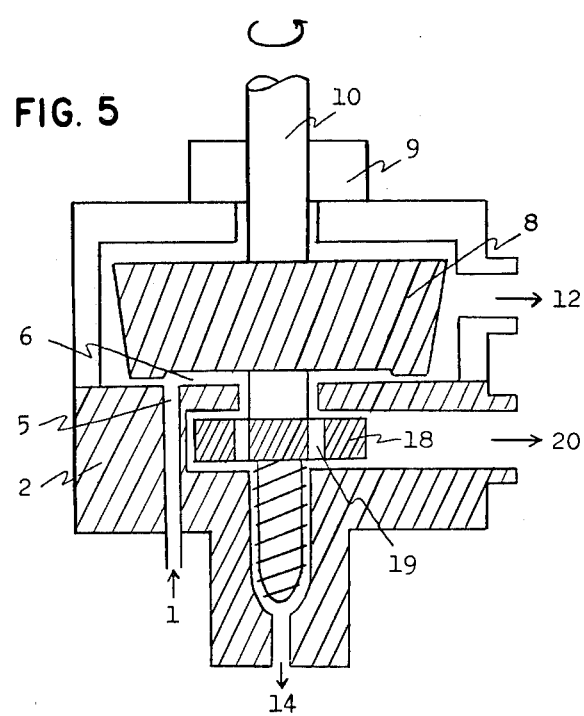
FIG. 5 is a front sectional view of an embodiment of the present apparatus having two stage removal of volatile components.

FIG. 5 shows an embodiment of the present apparatus having a two stage removal of the volatile components. In this apparatus, a second rotor (18) is provided in the same axis as that of the first rotor (8), and this second rotor (18) constitutes the second zone for removal of volatile components by the co-action of the opposite face of the stator (2) at both faces of the rotor (18). The volatile components thus separated are taken out from a second outlet (20), and the polymer composition after removal of volatile components is taken out from the outlet (14). The rotor (18) also has an opening (19) for passage of the polymer composition.

The thermoplastic polymers used in the present invention include all polymers which can produce hydrodynamic pressure owing to the Weissenberg effect, such as homopolymers of methyl methacrylate, and alkyl methacrylate having 2 to 8 carbon atoms in the alkyl moiety, an alkyl acrylate having 1 to 8 carbon atoms in the alkyl moiety, styrene, a styrene derivative (e.g. p-chlorostyrene, p-methylstyrene, α-methylstyrene), and unsaturated nitrile derivative (e.g. acrylonitrile, methacrylonitrile), a conjugated diene derivative (e.g. butadiene, isoprene), an unsaturated monomer (e.g. isobutylene), or the like, or a copolymer containing 60% by weight of more of one or more of the above monomers; ethylene/vinyl acetate copolymer; ethylene/alkyl acrylate copolymer wherein the alkyl moietyl has 1 to 8 carbon atoms; ethylene/propylene/diene terpolymer (EPDM); and a polyhydroxy polyether compound which is derived from bisphenol A and is substantially linear and has a repeating unit of the formula:

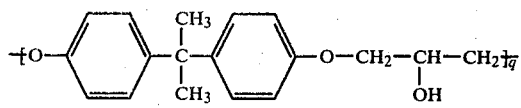

wherein q means a degree of polymerization; which are used alone or in a mixture of two or more thereof. A particularly suitable thermoplastic polymer is methyl methacrylate polymer which is suitable for the production of molding materials and extruded plate, particularly a polymer or copolymer which contains 60% by weight or more of methyl methacrylate and has an extruder output (MFI value) of 0.2 to 50 per 10 minutes when measured under the same conditions as described in JIS K-7210, i.e. temperature: 210° C. and load: 10 kg. The methyl methacrylate polymer used in the present specification is a homopolymer of methyl methacrylate and a copolymer produced by copolymerizing a monomer mixture comprising methyl methacrylate and 40% by weight or less, preferably 20% by weight or less, of one or more vinyl monomers selected from an alkyl methacrylate having 2 to 8 carbon atoms in the alkyl moiety, styrene or its halogen- or alkyl-substituted derivative, vinyl acetate, acrylonitrile or its derivative, acrylamide or its derivatives, acrylic acid or its derivative, and an alkyl acrylate having 1 to 8 carbon atoms in the alkyl moiety. The methyl methacrylate polymer used in the present invention may also include graft copolymers produced by graft-copolymerizing a liquid mixture of 1 to 20 parts by weight of a rubbery polymer selected from a polybutadiene, a styrene/butadiene copolymer, an ethylene/vinyl acetate copolymer, and an ethylene/alkyl acrylate copolymer having 1 to 8 carbon atoms in the alkyl moiety in 100 parts by weight of methyl methacrylate or the above-mentioned monomer mixture comprising predominantly methyl methacrylate. The vinyl compounds and rubbery copolymers mentioned above are used for improving the properties of the molding materials and extruded plates in the above-mentioned amount unless the properties of methyl methacrylate resin are lost.

The thermoplastic polymer composition used in the present specification is a mixture of the above-mentioned thermoplastic polymers and unreacted monomers, solvents and/or by-products, which may also contain various additives such as heat stabilizers, ultraviolet absorbers, colorants, plasticizers, release agents, lubricants, and surfactants, and further additionally various fillers such as glass fibers, inorganic salts, or metal oxides in an amount equal to or lower than that of the thermoplastic polymer. The thermoplastic polymer composition includes not only polymer compositions produced by bulk polymerization or solution polymerization methods but also various wastes containing thermoplastic polymers obtained from other processes. Examples of such wastes are liquid compositions containing predominantly methyl methacrylate polymer and methyl methacrylate monomer, such as waster and/or washing liquid of a methyl methacrylate prepolymer syrup which is used for the production of methacrylate resin plates by cell casting or continuous casting. The syrup used in cell casting usually contains a polymer having a number average polymerization degree of 1,000 to 20,000, and has a polymer content of 2 to 20% by weight and a viscosity of 0.5 to 10 poises. The syrup used in continuous casting usually contains a polymer having a number average polymerization degree of 300 to 2,000, and has a polymer content of 20 to 40% by weight and a viscosity of 1 to 200 poises.

When the polymer composition decomposes without melting by heating or has an extremely high viscosity even when it is molten by heating, there are some difficulties in the removal of volatile compomponents, such as decrease of capacity due to foaming within the extrusion machine under usual heating condition, or unsmoothness of extrusion of the polymer composition after removal of volatile components. However, if the temperature is raised to about 300° C. in order to avoid the above defects, it results in pyrosis of the polymer and deterioration or coloring of the polymer composition and further in a lowering of the yield and quality of the recovered monomers. These defects are particularly remarkable in case of polymethyl methacrylate, more particularly in case of polymethyl methacrylate having a number average polymerization degree of 1,000 or more and/or containing inorganic additives. The process of the present invention can also be applied to such polymer compositions and can recover the monomers therefrom in high quality. That is, in an embodiment of the present invention, a liquid composition comprising 0.1 to 40% by weight, preferably 1 to 30% by weight, of a solid component comprising predominantly polymethyl methacrylate and 60 to 99.9% by weight, preferably 70 to 99%, by weight, of methyl methacrylate monomer is applied to the process of the present invention in the presence of plasticizer of 1 to 30% parts by weight per 100 parts by weight of the solid component, by which methyl methacrylate monomer can be recovered in high yield and high quality. This process using a plasticizer is particularly suitable for the treatment of the polymer composition containing a polymer having a number average polymerization degree of about 1,000 to 20,000.

The solid component comprising predominantly polymethyl methacrylate contained in the above liquid composition is usually composed of polymethyl methacrylate alone, i.e. methyl methylacrylate homopolymer and/or methyl methacrylate copolymer alone, but may be composed of 50 to 100% by weight, preferably 80 to 100% by weight, of polymethyl methacrylate and 0 to 50% by weight, preferably 0 to 20% by weight, of an inorganic compound. When the content of the inorganic compound is over 50% by weight, the polymer composition after the removal of volatile components is hardly extruded. Such inorganic compound include pigments such as barium sulfate, titanium oxide, aluminum hydroxide, or cadmium sulfide. When the liquid composition is introduced into the evapo-extrusion machine, it is preferable to previously add a plasticizer to the composition in an amount of 1 to 30 parts by weight, more preferably 2 to 20 parts by weight, per 100 parts by weight of the solid component in the liquid composition. The plasticizer may be added just before introduction of the liquid composition into the machine, but may also be added in the previous step. When the amount of the plasticizer is lower than the above lower limit, too large of a power is required for rotating the rotor or screw, and further, the extrusion can not be done in a constant state. On the other hand, when the plasticizer is contained in a larger amount than the above upper limit, the extrusion torque becomes too small and the plasticizer is contaminated into the recovered monomer, and the capacity of the machine lowers.

The plasticizer used in the present invention includes ester plasticizers having excellent compatibility with polymethyl methacrylate and having a boiling point of 250° C. or higher, preferably 300° C. or higher, under atmospheric pressure, such as dialkyl phthalate, alkyl oleate, alkyl stearate, dialkyl adipate and trialkyl trimellitate wherein the alkyl moiety has 1 to 14 carbon atoms, epoxyalkyl stearate having 2 to 8 carbon atoms in the alkyl moiety, and methyl methacrylate oligomer having a polymerization degree of 2 to 20. Suitable examples of the plasticizer are di-n-butyl phthalate, di-2-ethylhexyl phthalate, di-n-octyl phthalate, di-n-decyl phthalate, ditridecyl phthalate, butyl oleate, butyl stearate, diethyl adipate, diisobutyl adipate, dioctyl adipate, diisodecyl adipate, tri-2-ethylhexyl trimellitate, tri-n-octyl trimellitate, triisodecyl trimellitate, expoxybutyl stearate, and polymethyl methacrylate having a polymerization degree of 5 to 15.

The present invention is illustrated by the following Examples, but is not limited thereto.

EXAMPLE 1

An apparatus as shown in FIG. 1 was used, except that it had no winding part (13) and no small screw (16).

A polymer composition consisting of 65% by weight of styrene/methyl methacrylate copolymer, 24% by weight of styrene monomer and 11% by weight of methyl methacrylate monomer, which was produced by bulk polymerization, was heated and pressured to 200° C. and 15 atm. The pressurized and heated polymer composition was directly blown onto the rotor face (7) being rotated at 300 rpm via the pore (5) provided on the stator face (3) in the rotating disc evapo-extrusion machine, wherein the inner pressure was kept at 260 Torr and a heating medium at 230° C. was circulated in the heating medium circulation (11) provided on the stator (2). After removing the volatile components, the polymer composition was taken out from the outlet (14) provided at the central area of the face of stator (3) at a rate of about 3 kg/hour. The obtained polymer composition had an apparent specific gravity of 1.0 or more with almost no foam and had a remaining volatile component content of 0.8% by weight. The separated volatile components were taken out from the outlet (12) and condensed with a condenser and then recovered. The yield of recovery was higher than 98%.

In the apparatus, the rotor face had a diameter of 160 mm, the distance of the gap (6) between the rotor face (7) and the stator face (3) was 1.5 mm, the inner diameter of the pore (5) was 5 mm, and the pore (5) was provided at a position of 40 mm from the center of the rotating axis. Furthermore, the outlet nozzle (14) for taking out the polymer composition had an inner diameter of 5 mm.

EXAMPLES 2 to 4

The liquid polymer compositions as shown in Table 1 were subjected to the evapo-extrusion by using an apparatus as shown in FIG. 2-a, wherein the face of rotor (7) had a diameter of 100 mm, the rotating number was 500 rpm, the size of the gap between the rotor face (7) and the stator face (3) was 1.0 mm, and the pore was provided at a position of 35 mm from the center of the rotating axis. The liquid polymer composition was heated and pressurized to 200° C. and 20 atm. and then supplied into the gap (6) under atmospheric pressure via the needle valve (4) at a flow rate of 0.5 liter/hour. In all examples, the recovered volatile components had no contamination of the polymer composition, and the obtained polymer compositions had a remaining volatile component content of less than 1% by weight. Besides, the polymer compositions after removal of volatile components were not retained within the apparatus, and the operation could constantly be continued for over 10 hours.

TABLE 1

| | Components of liquid polymer compositions | | |
|---|---|---|---|
| Ex. No. | Thermoplastic polymer | Monomer or solvent | Content of polymer (%) |
| 2 | Mixture of polymethyl methacrylate and barium sulfate | Methyl methacrylate | 5 (barium sulfate 0.5) |
| 3 | Acrylic rubber*[1] | Toluene | 5 |
| 4 | Ethylene/vinyl acetate copolymer*[2] | Methyl methacrylate | 10 |

*[1]Ton-acron® PS-200, made by Toa Paint Co.
*[2]Evatate® R5011, made by Sumitomo Chemical Co., Ltd.

EXAMPLES 5 to 10

The liquid polymer compositions as shown in Table 2 were subjected to the evapo-extrusion by using an apparatus as shown in FIG. 3-a, which was the same as the apparatus shown in FIG. 2-a except that the rotor face (7) had spiral projections (width: 5 mm, height: 1 mm) and there was a gap of 0.5 mm between the face of the projection tip and the stator face. The liquid polymer compositions were heated and pressurized to 200° C. and 20 atm. and were supplied into the gap under atmospheric pressure via the needle valve (4) at a flow rate of 0.5 liter/hour. In all examples, the recovered volatile components had no contamination of the polymer composition, and the obtained polymer compositions had a remaining volatile component content of less than 1% by weight. Besides, the polymer compositions after removal of volatile components were not retained within the apparatus, and the operation could constantly be continued for over 10 hours.

TABLE 2

| | Components of liquid polymer compositions | | |
|---|---|---|---|
| Ex. No. | Thermoplastic polymer | Monomer or solvent | Content of polymer (%) |
| 5 | Mixture of polymethyl methacrylate and barium sulfate | Methyl methacrylate | 5 (barium sulfate 0.5) |
| 6 | Acrylic rubber*[1] | Toluene | 5 |
| 7 | Ethylene/vinyl acetate copolymer*[2] | Methyl methacrylate | 10 |
| 8 | Polybutadiene*[3] | n-Hexane | 10 |
| 9 | EPDM*[4] | n-Hexane | 5 |
| 10 | polyhydroxy polyether compound of formula [1]*[5] | Cyclohexane | 25 |

*[1]Toa-acron® PS-200, made by Toa Paint Co.
*[2]Evatate® NF-35A, made by Sumitomo Chemical Co., Ltd.
*[3]Diene® NF-35A, made by Asahi Chemical Co.
*[4]Esprene® 501, made by Sumitomo Chemical Co., Ltd.
*[5]Number average molecular weight: 12,000

EXAMPLE 11

Methyl methacrylate (92 parts by weight), ethyl acrylate (8 parts by weight), di-tert.-butylperoxide (0.0015 part by weight) and tert.-butylmercaptane (0.2 part by weight) were mixed with agitation under nitrogen gas in a mixing vessel, and the mixture was continuously supplied under pressure to an agitation type polymerization reactor with a quantitative pump at a rate of 7 liter/hour. Under the conditions of the reaction temperature: 160° C., pressure: 15 kg/cm²G and average retention time: 4.5 hours, the mixture was reacted to give a polymer composition containing 62% by weight of a copolymer having a number average polymerization degree of 560. The polymer composition was heated to 200° C. with a screw type heat exchanger while maintained under a pressure of 15 kg/cm²G and then directly blown onto the rotor face (7) being rotated at 300 rpm via the pore (5) provided at the stator face (3) in a rotating disc evapo-extrusion apparatus as shown in FIG. 1, wherein the inner pressure was kept at 260 Torr, and a heating medium of 250° C. was circulated in the heating medium circulation (11) provided on the stator (2). After the removal of volatile components, the polymer composition was taken out from the outlet (14) provided at the central area of the face of stator (3) at a rate of 4.17 kg/hour. The obtained polymer composition was colorless and clear without foam, and had an apparent specific gravity of 1.19, a remaining volatile component content of 0.7% by weight and an MFI value of 11.1.

The separated volatile components were condensed with a condenser and collected in a storage vessel and then used again in the mixing vessel.

In the rotating disc evapo-extrusion apparatus used herein, the pore (5) was a nozzle having an inner diameter of 2 mm and a length of 10 mm, and in the upper flow thereof a needle valve (4) for controlling the pressure loss was provided. The rotor face (7) had a diameter of 160 mm, the pore (5) was provided at a distance from the rotating axis of 40 mm. The stator face (3) had an inner diameter of 180 mm; the size of the gap (6) between the faces (3) and (7) was 2.2 mm; the demister (winding) part (13) had a pitch of 6 mm and a height (between the top of the convex and the bottom of the concave) of 6 mm; and the nozzle of the outlet (14) for taking out the polymer composition had an inner diameter of 5 mm and a length of 50 mm.

EXAMPLE 12

Figure 6:
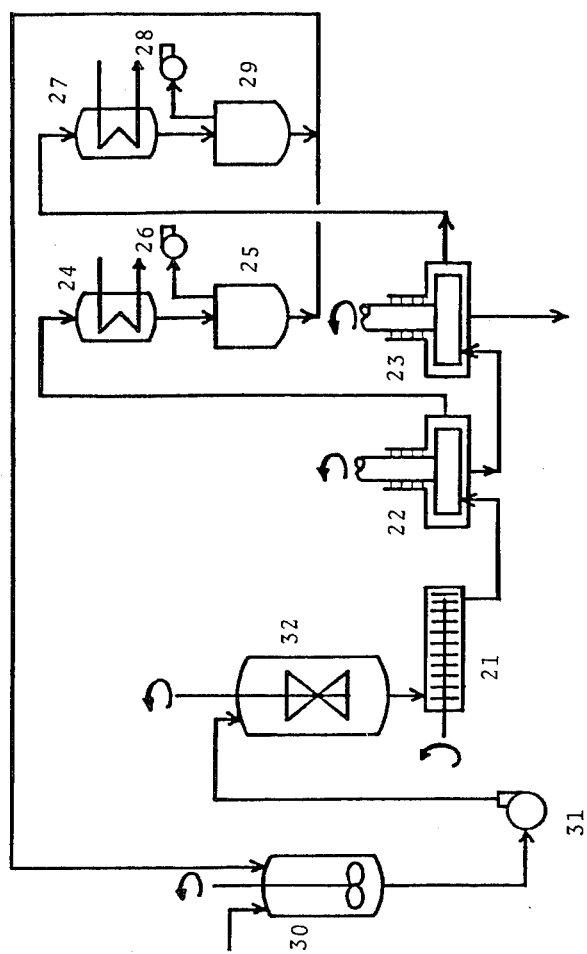
FIG. 6 is a flow sheet of the present process for treating methyl methacrylate resin molding material.

According to the flow shown in FIG. 6, the same starting materials as used in Example 10 were treated likewise in a mixing vessel (30), a pump (31), an agitation type polymerization reactor (32), and a screw type heat exchanger (21) to obtain a polymer composition containing 62% by weight of a polymer having a number average polymerization degree of 560 and having a temperature of 180° C. and a pressure of 15 kg/cm²G. The polymer composition was supplied to two rotating disc evapo-extrusion machines (22) and (23) which were arranged in series and was subjected to the separation of volatile components. The first evapo-extrusion machine (22) was kept at an inner temperature and pressure of 250° C. and atmospheric pressure, and the second evapo-extrusion machine (23) was kept at an inner temperature and pressure of 270° C. and 50 Torr, and the rotors were kept at a rotating speed of 300 rpm and 150 rpm, respectively. Additionally, in the first evapo-extrusion machine (22), an auxiliary pump was provided at the outlet for the polymer compositions, by which the pressure for taking out the the polymer composition was raised to 25 kg/cm²G. The polymer composition was taken out from the outlet of the second evapo-extrusion machine (23) at a rate of 5.9 kg/hour. The polymer composition thus obtained were colorless and clear without foam and had an apparent specific gravity of 1.19, a remaining volatile component content of 0.1% by weight, and an MFI value of 9.8. On the other hand, the separated volatile components were sent from the evapo-extrusion machines (22) and (23) to condensers (24) and (27) separately, in which they were condensed, and collected in storage vessels (25) and (29), and then combined. The combined volatile components were sent to the mixing vessel (30) and were used again.

EXAMPLE 13

A monomer mixture of methyl methacrylate (70% by weight) and styrene (30% by weight) was polymerized by bulk polymerization method to obtain a polymer composition having a polymer content of 30.8% by weight (said polymer having a number average polymerization degree of 405) and a styrene content of 34.8% by weight. The polymer composition was heated and pressured to 160° C. and 15 kg/cm²G and then supplied continuously to the same rotating disc evapo-extrusion machine as used in Example 10 except that the gap between faces (3) and (7) was 0.8 mm and the rotating speed was 550 rpm, and thereby the volatile components were separated. The evapo-extrusion machine had an inner temperature and pressure of 240° C. and 160 Torr. The polymer composition was taken out at a rate of about 0.5 kg/hour. The obtained polymer composition was colorless and clear without foam and had a remaining volatile component content of 0.8% by weight (methyl methacrylate: 0.6% by weight, and styrene: 0.2% by weight).

EXAMPLE 14

An apparatus as shown in FIG. 1 was used, wherein the rotor face (7) had a diameter of 100 mm, the gap (6) between the rotor face (7) and the stator face (3) had a size of 1 mm, the pore (5) had an inner diameter of 5 mm, the pore (5) was provided at a position of 25 mm from the center of the rotating axis, and the outlet nozzle (14) for taking out the polymer composition after removal of volatile components had an inner diameter of 4 mm.

A liquid polymer composition was prepared from 100 parts by weight of methyl methacrylate prepolymer suitable for the production of methacrylate resin cell casting plate (polymer content: 5% by weight, number average polymerization degree: about 10,000) and 1 part by weight of dibutyl phthalate (plasticizer). The liquid composition was heated and pressured to 200° C. and 20 atm., and was continuously supplied to the apparatus via the needle valve (4) for controlling the pressure and the pore (5) provided on the stator face (3) at a rate of 4 kg/hour and was directly blown onto the rotor face (7) rotating at 500 rpm. The inner part of the evapo-extrusion machine was maintained under atmospheric pressure, and a heating medium of 220° C. was circulated in the heating medium circulation (11) provided in the stator (2). The separated methyl methacrylate monomer was continuously taken out from the outlet (12) and condensed with a condenser and then recovered. The yield of recover was more than 98%. The recovered monomer had an APHA chromaticity of 0–5 and a content of impurities (low boiling point components and high boiling point components) of less than 0.1% by weight, which were the same as the chromaticity and content of impurities of the starting monomer used for the production of the prepolymer composition.

After removing most volatile components on the face rotor (7), the polymer composition was transferred toward the central area of the face of rotor by the hydrodynamic pressure produced by the rotation of the rotor at the gap (6) between the rotor face (7) and the stator face (3), and heated, by which the remaining volatile components were separated. After completing the removal of volatile components, the polymer composition was continuously taken out from the outlet (14) provided on the central area of the stator (2) at a rate of about 0.2 kg/hour. The obtained polymer composition had a remaining volatile component content of less than 1% by weight, and the amount of monomer unrevocered was so small as less than 0.1% by weight and could be ignored.

EXAMPLES 15 to 21

By using an apparatus as shown in FIG. 1, the liquid compositions as shown in Table 3 were treated in the same manner as described in Example 13 except that the speed of supplying the liquid compositions was increased stepwise. The results are shown in Table 4.

In all examples, the operation could constantly be carried out, and even at the maximum treating capacity, the yield of recovered monomer was more than 98% without an increase in the chromaticity or content of impurities. The polymer composition after removal of volatile components had a remaining volatile component content of less than 1% by weight.

TABLE 3

| Ex. No. | Polymethyl methacrylate Component | Number average polymer degree | Amount (part by weight) | Inorganic compound Component | Amount (part by weight) | Methyl methacrylate monomer Component | Amount (part by weight) | Plasticizer Kind | Amount (part by weight) |
|---|---|---|---|---|---|---|---|---|---|
| 15 | Homopolymer of MMA*¹ | 10,000 | 5 | Barium sulfate | 2 | MMA | 93 | Dibutyl phthalate | 0.5 |
| 16 | Homopolymer of MMA*¹ | 2,000 | 10 | — | — | MMA | 90 | Dioctyl adipate | 0.5 |
| 17 | Homopolymer of MMA*¹ | 2,000 | 10 | Aluminum hydroxide | 5 | MMA | 85 | Dioctyl adipate | 0.5 |
| 18 | Homopolymer of MMA*¹ | 2,000 | 2 | — | — | MMA | 98 | Dioctyl adipate | 0.1 |
| 19 | Mixture of Poly-MMA & Polystyrene | 10,000 8,000 | 4 1 | — | — | MMA | 95 | Dibutyl phthalate | 0.5 |
| 20 | Copolymer of MMA/EA*² (95/5) | 500 | 25 | — | — | MMA/EA (95/5) | 75 | Dibutyl phthalate | 0.5 |
| 21 | Homopolymer of MMA | 500 | 25 | — | — | MMA | 75 | MMA oligomer*³ | 0.5 |

*¹MMA: Methyl methacrylate
*²EA: Ethyl acrylate,
*³Average polymerization degree: about 10

TABLE 4

| Example No. | Maximum capacity for treating the liquid composition (liter/hour) |
|---|---|
| 15 | More than 4 |
| 16 | More than 4 |
| 17 | 2 |
| 18 | More than 4 |
| 19 | 3 |
| 20 | More than 4 |
| 21 | More than 4 |

What is claimed is:

1. A rotating disc evapo-extrusion process for removing volatile components from a thermoplastic polymer composition containing volatile components, which comprises applying a pressure sufficient to maintain the composition in substantially a liquid state and applying all or a part of the heat necessary for evaporating the volatile components to the composition, supplying the pressured and heated composition to a rotating disc evapo-extrusion machine, in which a rotor and a stator are provided with substantially parallel opposed faces separated by a fixed space and the inner pressure is maintained at from 5 Torr to 1,500 Torr, said pressured and heated composition being supplied through a pore in said stator and being directly blown onto the face of the rotor, thereby separating and recovering a majority of the volatile components from the peripheral part of the rotor, and transferring, with heating, the polymer composition toward the central area of the face of the rotor by a hydrodynamic pressure produced by the rotation of the rotor, whereby remaining volatile components are separated and recovered from the peripheral part of the rotor and polymer composition is recovered from an outlet which is provided at the central part of the face of the stator.

2. A process according to claim 1, wherein the thermoplastic polymer to be applied is a member selected from the group consisting of a homopolymer of a monomer selected from an alkyl methacrylate having 1 to 8 carbon atoms in the alkyl moiety, an alkyl acrylate having 1 to 8 carbon atoms in the alkyl moiety, styrene, p-chlorostyrene, p-methylstyrene, α-methylstyrene, vinyl acetate, acrylonitrile, methacrylonitrile, butadiene, isoprene and isobutylene, a copolymer containing 60% by weight or more of one or more of the above-mentioned monomers, an ethylene/vinyl acetate copolymer, an ethylene/alkyl acrylate copolymer having 1 to 8 carbon atoms in the alkyl moiety, an ethylene/propylene/diene terpolymer, and a polyhydroxy polyether compound which is derived from a bisphenol A and is substantially linear and has a repeating unit of the formula:

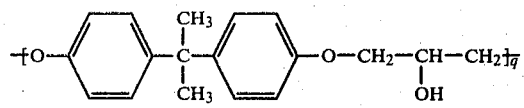

wherein q means a degree of polymerization.

3. A process according to claim 3, wherein the thermoplastic polymer is a homopolymer of methyl methacrylate or a copolymer containing 60% by weight or more of methyl methacrylate.

4. A process according to claim 1, wherein the polymer composition contains the volatile components in an amount of 25 to 99.9% by weight.

5. A process according to claim 1, wherein the polymer composition is heated and pressured to a temperature of from 150° to 290° C. and a pressure of from 5 to 100 kg/cm² G before being supplied to the machine.

6. A process according to claim 1, wherein the pore is provided in the face of stator at the position of 0.2 to 0.8 time of the radius from the center of the face of rotor.

7. A process according to claim 1, wherein the face of the rotor and/or the face of the stator is heated with a heating medium of 180° to 320° C.

8. A process according to claim 1, wherein the gap between the face of rotor and the face of stator is in a size of 0.2 to 20 mm.

9. A process according to claim 1, wherein the rotor is rotated at a rotating speed of 50 to 1,000 rpm.

10. A process according to claim 1, wherein the polymer composition taken out has a remaining content of volatile components of 10% by weight or less.

11. A process according to any one of claim 1, 2, 3, 4, 5, 6, 7, 8, 9, or 10, wherein the thermoplastic polymer composition to be treated is a methyl methacrylate polymer composition produced by a bulk polymerization method or solution polymerization method which contains 25 to 90% by a weight of volatile components, the evapo-extrusion machine has an inner pressure of from 50 Torr to 1,500 Torr, and the polymer composition taken out has a remaining content of volatile components of 0.3 to 5% by weight.

12. A process according to claim 1, wherein the thermoplastic polymer composition to be treated is a liquid composition comprising 0.1 to 40% by weight of a solid component comprising predominantly polymethyl methacrylate and 60 to 99.9% by weight of methyl methacrylate monomer, which contains a plasticizer in an amount of 1 to 30 parts by weight per 100 parts by weight of the solid component of the liquid composition.

13. A process according to claim 12, wherein the solid component of the liquid composition consists essentially of 50 to 100% by weight of polymethyl methacrylate and 0 to 50% by weight of an inorganic compound.

14. A process according to claim 13, wherein the inorganic compound is a member selected from the group consisting of barium sulfate, titanium oxide, and aluminum hydroxide.

15. A process according to claim 12, wherein the liquid composition is a waste or washing liquid of methyl methacrylate prepolymer syrup for the production of a cell casting plate.

16. A process according to claim 12, wherein the polymethyl methacrylate has a number average polymerization degree of 1,000 to 20,000.

17. A process according to claim 12, wherein the plasticizer is a member selected from the group consisting of di-n-butyl phthalate, di-2-ethylhexyl phthalate, di-n-octyl phthalate, di-n-decyl phthalate, ditridecyl phthalate, butyl oleate, butyl stearate, diethyl adipate, diisobutyl adipate, dioctyl adipate, diisodecyl adipate, tri-2-ethylhexyl trimellitate, tri-n-octyl trimellitate, triisodecyl trimellitate, epoxybutyl stearate, and methyl methacrylate having a polymerization degree of 5 to 15.

18. A rotating disc evapo-extrusion apparatus comprising:
a rotor and a stator having a rotor face and a stator face respectively spaced from and facing each other and substantially parallel to each other;
means for maintaining a separation space between said faces;
rotating means for rotating said rotor about its axis for producing a hydrodynamic pressure between said faces;
sealing means for sealing said axis for maintaining the inner pressure of the apparatus at a constant pressure;
an inlet opening through said stator for supplying a polymer composition to said separation space between said rotor and stator faces;
inlet control means controlling the size of said inlet opening for maintaining the pressure of the polymer composition being supplied;
a first outlet means for removing volatile components, said first outlet means being located at the periphery of said faces;
said inlet opening being located inwardly of said first outlet means; and
a second outlet means in said stator face and communicating with said separation space for removing the polymer composition from which volatile components have been removed, said second outlet means being located inwardly of said inlet opening.

19. A rotating disc evapo-extrusion apparatus according to claim 18, wherein the rotor and/or stator has a means for heating the polymer composition through the face thereof.

20. A rotating disc evapo-extrusion apparatus according to claim 18, wherein said rotor face or said stator face includes spiral, radial or logarithmic helical projections or channels, or concentric circularly arranged tilted blades, or a combination thereof.

21. A rotating disc evapo-extrusion apparatus as in claim 18, wherein the distance between said second outlet means and said inlet means is 0.2 to 0.8 times the distance between said first and second outlet means.

22. A rotating disc evapo-extrusion apparatus as in claim 18, further including an auxiliary pump means in said second outlet means for maintaining the extrusion speed.

23. A rotating disc evapo-extrusion apparatus as in claim 22, wherein said auxiliary pump means comprises a threaded screw means extending from said rotor face and through said second outlet means.

24. A rotating disc evapo-extrusion apparatus as in claim 18, further including an outlet control means for controlling the size of said second outlet means.

25. A rotating disc evapo-extrusion apparatus comprising:
a first rotor and a first stator having a first rotor face and a first stator face respectively spaced from and facing each other and substantially parallel to each other;

means for maintaining a first separation space between said faces;

rotating means for rotating said rotor about its axis for producing a hydrodynamic pressure between said faces;

sealing means for sealing said axis for maintaining the inner pressure of the apparatus at a constant pressure;

an inlet opening through said stator for supplying a polymer composition to said first separation space;

inlet control means for controlling the size of said inlet opening for maintaining the pressure of the polymer composition being supplied;

a first outlet means for removing volatile components, said inlet opening being located inwardly of said first outlet means;

a second outlet means communicating with said first separation space for removing the polymer composition from which volatile components have been removed, said second outlet means being located inwardly of said inlet opening;

a second rotor coaxial with and positioned below said first rotor and below said first stator face, said second rotor including a second rotor face and a third rotor face;

a second stator face spaced from and facing said second rotor face with a second separation space defined therebetween;

a third stator face spaced from and facing said third rotor face with a third separation space defined therebetween;

said second outlet means communicating with said second separation space;

a passage means through said second rotor and communicating with said second separation space and said third separation space;

a third outlet means for removing volatile components being located at the periphery of said third rotor face and said third stator face; and a fourth outlet means communicating with said third separation space for removing the polymer composition from which volatile components have been removed, said fourth outlet means being located inwardly of said passage means.

26. A rotating disc evapo-extrusion apparatus as in claim 25, further including an auxiliary pump means in said fourth outlet means for maintaining the extrusion speed.

27. A rotating disc evapo-extrusion apparatus as in claim 26, wherein said auxiliary pump means comprises a threaded screw means extending from said third rotor face and through said fourth outlet means.

* * * * *